Patented Sept. 28, 1948

2,450,386

UNITED STATES PATENT OFFICE 2,450,386

MANUFACTURE OF COMPOUNDS CONTAINING AMIDINE GROUPS

Wallace Frank Short and Maurice William Partridge, Nottingham, England, assignors to Boots Pure Drug Company Limited, Nottingham, England, a company of Great Britain No Drawing. Application August 23, 1946, Serial No. 692,700. In Great Britain September 4, 1945

4 Claims. (Cl. 260—564).

This invention relates to the manufacture of amidines from nitriles of the general formula R.CN where R is an alkyl, aryl, aralkyl, alicyclic or heterocyclic group.

It is the object of the present invention to provide improved processes whereby an amidine may be formed from ammonia or an amine and a nitrile.

According to the invention, a nitrile of the general formula given above is treated in the presence of a suitable catalyst or converting substance with ammonia or with an amine of the general formula $NHR_1R_2$ where $R_1$ may be hydrogen or an alkyl, aryl, aralkyl, alicyclic or heterocyclic group and $R_2$ may be an alkyl, aryl, aralkyl, alicyclic or heterocyclic group or $R_1$ and $R_2$ may be combined in the form of a polymethylene chain. A reaction product is thereby obtained from which the amidine can be readily isolated.

As the catalyst or converting substance there may be used metal salts, especially halides, for example aluminium chloride, zinc chloride, ferric chloride and stannic chloride.

Instead of using ammonia or an amine with a salt of the above type, a preformed double compound of the salt with ammonia or an amine may be used.

Alternatively, instead of using ammonia, a substance which acts as a source of ammonia under the conditions of the reaction, e. g. urea, may be used in the reaction.

It will be evident that neither the nitrile nor amine must contain any substituent which will adversely affect the catalytic action of the aluminium chloride or other catalyst or converting substance. In general where aluminium chloride is used as a converting substance it is preferred to use an equimolecular mixture of nitrile, amine and aluminium chloride ($AlCl_3$) but the invention is not limited to the use of this proportion of reacting substances.

In order that the invention may be clearly understood and readily carried into effect the following examples are given.

Example 1

In the preparation of phenylacetamidine picrate a mixture of 1.2 g. of benzyl cyanide 9.6 g. of urea and 1.4 g. of powdered anhydrous zinc chloride is heated, with vigorous stirring, at a temperature of 180° C. during 1 hour. After cooling, the product is dissolved in 20 cc. of hot water and the solution is added with stirring to a mixture of 10 cc. of 10 N sodium hydroxide solution and 10 g. of ice. The mixture is then extracted with chloroform and the chloroform solution is concentrated by distillation and mixed with an alcoholic solution of picric acid. Phenylacetamidine picrate is deposited in the form of crystals having a melting point of 227–228° C. with decomposition. (Found N, 19.1; $C_{14}H_{13}O_7N_5$ requires N, 19.3%.)

Example 2

In the preparation of benzamidine picrate a mixture of 2.1 g. of benzonitrile and 5.3 g. of powdered anhydrous aluminium chloride is heated at a temperature of 100° C. while a stream of dry ammonia gas is led into the reaction vessel. After 30 minutes heating the product is cooled and extracted with 10 cc. of hot water. The aqueous solution is filtered from insoluble material, cooled and added with stirring to a mixture of 10 cc. of 10 N sodium hydroxide solution and 10 g. of ice. The mixture is then extracted five times with 10 cc. portions of chloroform and the combined chloroform extracts are mixed with a warm alcoholic solution of picric acid. Benzamidine picrate separates on cooling and is purified by recrystallisation from methyl alcohol whereby it is obtained in the form of crystals having a melting point of 239–240° C.

Example 3

In the preparation of p-nitrobenzamidine picrate a mixture of 1.5 g. of p-nitrobenzonitrile and 2.4 g. of aluminium hexamminochloride $$AlCl_3.6NH_3$$

(prepared by passing dry ammonia gas over anhydrous aluminium chloride) is heated at a temperature of 150° C. during 6 hours. After cooling, the product is extracted with 10 cc. of hot water and the aqueous solution is cooled and added with stirring to a mixture of 10 cc. of 10 N sodium hydroxide solution and 10 g. of ice. The crude amidine which is precipitated is filtered off and suspended in 10 cc. of water and hydrochloric acid is added until the solution is just acid to Congo red paper. The solution is then filtered and to the filtrate a solution of sodium picrate is added. p-Nitrobenzamidine picrate is deposited in the form of crystals having a melting point of 234–236° C. with decomposition.

Example 4

In the preparation of p-nitrobenzamidine picrate a mixture of 3 g. of p-nitrobenzonitrile and 2.8 g. of finely powdered anhydrous zinc chloride is heated at a temperature of 135° C. with stirring while dry ammonia gas is led into the reaction vessel during 25 minutes. The solid reaction product obtained is cooled and triturated with 20 cc. of hot water and the aqueous solution is poured with stirring into a mixture of 10 cc. of 10 N sodium hydroxide solution and 10 g. of ice. The solid which is precipitated is filtered off, washed with water suspended in 20 cc. of water and hydrochloric acid is added until the solution is neutral to Congo red paper. The solution is then filtered and a solution of sodium picrate is added. p-Nitrobenzamidine picrate which is precipitated is purified by crystallisation from water whereby it is obtained in the form of crystals having a melting point of 239–240° C.

*Example 5*

In the preparation of p-nitrobenzamidine a mixture of 1.5 g. of p-nitrobenzonitrile, 9.6 g. of urea and 1.3 g. of finely powdered anhydrous aluminium chloride is heated, with vigorous stirring, at a temperature of 180° C. during 30 minutes. During heating ammonia is evolved. After cooling, the product is triturated with 10 cc. of hot water and poured with stirring into a mixture of 10 cc. of 10 N sodium hydroxide solution and 10 g. of ice. The solid which is precipitated is filtered off, suspended in 10 cc. of water and dilute hydrochloric acid is added until the solution is neutral to Congo red paper. The mixture is then filtered and the filtrate is poured with stirring into a mixture of 5 cc. of 10 N sodium hydroxide solution and 10 g. of ice. p-Nitrobenzamidine which is precipitated is filtered off, washed with water and dried in vacuum, and is thereby obtained as a solid having a melting point of 218° C. with decomposition. For conversion into p-nitrobenzamidine picrate, p-nitrobenzamidine is dissolved in alcohol and the solution is treated with a small excess of alcoholic picric acid solution. On cooling, p-nitrobenzamidine picrate is deposited in crystals having a melting point of 239–240° C. with decomposition. (Found N, 21.3; $C_{13}H_{10}O_9N_6$ requires N, 21.3%.)

A similar result is obtained when this procedure is repeated using 1.4 g. of finely powdered anhydrous zinc chloride instead of 1.3 g. of aluminium chloride. Also a mixture of 1.5 g. of p-nitrobenzonitrile, 2.4 g. of urea and 2.6 g. of stannic chloride can be used successfully in this preparation.

*Example 6*

In the preparation of p-nitrobenzamidine picrate a mixture of 1.5 g. of p-nitrobenzonitrile, 9.6 g. of urea and 1.6 g. of powdered anhydrous ferric chloride is heated, with vigorous stirring, at a temperature of 180° C. during 10 minutes. During heating ammonia is evolved. After cooling, the product is triturated with 10 cc. of hot water and filtered. The filtrate is cooled while ammonium hydroxide solution is added with stirring until the solution is just alkaline to brilliant yellow paper. The precipitate is filtered off and the filtrate is added with stirring to a mixture of 10 cc. of 10 N sodium hydroxide solution and 10 g. of ice. p-Nitrobenzamidine which is precipitated is converted into the picrate as described in Example 5.

*Example 7*

In the preparation of o-nitrobenzamidine picrate a mixture of 5.6 g. of o-nitrobenzonitrile, 5.0 g. of powdered anhydrous aluminium chloride and 36.0 g. of urea is heated with vigorous stirring at a temperature of 180° C. for 2 hours. After cooling, the product is dissolved in 50 cc. of warm water and the solution is poured with stirring on to a mixture of 30 cc. of 10 N sodium hydroxide solution and 50 g. of ice. The alkaline mixture is extracted five times with 100 cc. portions of chloroform and the combined chloroform extracts are washed with 5 cc. of water and then distilled in order to remove chloroform. The residue from this distillation is suspended in 20 cc. of water and 2 N hydrochloric acid is added until the solution is neutral to brilliant yellow. The solution is then warmed, stirred with a little charcoal and filtered and the filtrate is mixed with excess sodium picrate solution. o-Nitrobenzamidine picrate which is thereby precipitated is filtered off, washed with water and purified by recrystallisation from aqueous methyl alcohol whereby it is obtained in the form of crystals having a melting point of 228–229° C. (Found: N, 21.4; $C_{13}H_{10}O_9N_6$ requires N, 21.3%.)

*Example 8*

In the preparation of β-naphthamidine picrate a mixture of 1.5 g. of β-naphthonitrile, 9.6 g. of urea and 1.3 g. of powdered anhydrous aluminium chloride is heated, with vigorous stirring, at a temperature of 180° C. during 1 hour. After cooling, the product is heated for a short time with 10 cc. of water and filtered. The filtrate is added with stirring to a mixture of 10 cc. of 5 N sodium hydroxide solution and 5 g. of ice and the mixture is filtered. The solid product obtained is suspended in 10 cc. of water, hydrochloric acid is added until the solution is neutral to Congo red paper and the solution is filtered, warmed and mixed with an alcoholic solution of picric acid. On cooling, β-naphthamidine picrate separates and is purified by recrystallisation from methyl alcohol whereby it is obtained in the form of crystals having a melting point of 252° C. with decomposition.

*Example 9*

In the preparation of N-cyclohexyl-αα-diethylacetamidine hydrochloride 10.6 g. of finely powdered anhydrous aluminium chloride are added with stirring to a mixture of 7.7 g. of diethylacetonitrile and 9.6 g. of cyclohexylamine. The heat of the reaction raises the temperature of the mixture to about 200° C. After the addition, the mixture is allowed to cool to a temperature of about 100° C. and it is then mixed with 100 g. of ice. The solid material is filtered off, washed with a little ether and purified by crystallisation from 125 cc. of 0.5 N hydrochloric acid. There is thus obtained N-cyclohexyl-αα-diethylacetamidine hydrochloride in the form of crystals having a melting point of 240–242° C. (Found: N, 12.3; $C_{12}H_{25}N_2Cl$ requires N, 12.0%.)

*Example 10*

In the preparation of N-cyclohexyl phenylacetamidine 7.0 g. of finely-powdered anhydrous aluminium chloride is added to a mixture of 9.9 g. of cyclohexylamine and 11.7 g. of benzyl cyanide. The mixture, which becomes heated to about 200° C. by an exothermic reaction, is allowed to cool and the product is crystallised from water whereby N-cyclohexylphenylacetamidine hydrochloride is obtained in the form of crystals having a melting point of 301–302° C. (Found: N, 11.0; $C_{14}H_{21}N_2Cl$ requires N, 11.1%.)

The hydrochloride is shaken with a mixture of cold sodium hydroxide solution and chloroform, the chloroform solution is separated and distilled in order to remove chloroform and the residue is crystallised from light petroleum whereupon N-cyclohexyl phenylacetamidine is obtained in the form of crystals having a melting point of 122.5° C. (Found: N, 13.0; $C_{14}H_{20}N_2$ requires N, 13.0%.)

Example 11

In the preparation of N-cyclohexyl phenylacetamidine hydrochloride a mixture of 9.9 g. of cyclohexylamine and 11.7 g. of benzylcyanide is stirred in a vessel fitted with a reflux condenser and 13.4 g. of finely-powdered anhydrous aluminium chloride are added. When about a quarter of the aluminium chloride has been added the temperature of the mixture has risen to about 140°, due to the heat of reaction, and the rate of addition of the remainder of the aluminium chloride is regulated so that the mixture is maintained at this temperature. After the addition, the mixture is allowed to cool and the cool product is added to 100 cc. of water. The solid material reacts with evolution of heat. After cooling the suspension N-cyclohexyl phenylacetamidine hydrochloride is collected and is purified by recrystallisation from water whereby it is obtained in the form of crystals having a melting point of 301-302° C. with decomposition.

A slightly smaller yield of the required material is obtained when the above procedure is carried out using half the stated quantity of anhydrous aluminium chloride.

Example 12

In the preparation of N-cyclohexyl phenylacetamidine hydrochloride a mixture of 9.9 g. of cyclohexylamine and 11.7 g. of benzyl cyanide is stirred in a cooled vessel and 6.8 g. of finely-powdered anhydrous aluminium chloride are added at such a rate that the temperature of the mixture is maintained at about 80° C. After the addition the mixture is heated so that the temperature is maintained at 80° C. for 30 minutes. After cooling, the mixture is worked up and N-cyclohexyl phenylacetamidine hydrochloride is isolated as described in Example 11.

Example 13

In the preparation of N-cyclohexyl phenylacetamidine hydrochloride a mixture of 14.9 g. of cyclohexylamine and 5.9 g. of benzylcyanide is stirred in a cooled vessel and 3.4 g. of finely-powdered anhydrous aluminium chloride are added at such a rate that the temperature of the mixture is maintained at about 80° C. After the addition the mixture is heated so that the temperature is maintained at 80° C. for 30 minutes and it is then allowed to cool. The product is mixed with 20 cc. of water and 190 cc. of alcohol and 5 N hydrochloric acid is added until the solution is just acid to Congo red. The hot solution is filtered and on cooling N-cyclohexyl phenylacetamidine hydrochloride separates. More of this material is obtained by concentrating the mother liquor.

Example 14

In the preparation of N-cyclohexyl phenylacetamidine hydrochloride a mixture of 4.9 g. of cyclohexylamine and 17.5 g. of benzylcyanide is stirred in a cooled vessel and 3.4 g. of finely powdered anhydrous aluminium chloride are added at such a rate that the temperature of the mixture is maintained at about 80° C. After the addition the mixture is heated so that the temperature is maintained at 80° C. for 50 minutes. The mixture is then cooled and mixed with 50 cc. of warm water. On cooling this mixture N-cyclohexyl phenylacetamidine hydrochloride separates and is filtered off, washed with benzene and recrystallised from water whereby it is obtained in the form of crystals having a melting point of 301-302° C. with decomposition.

Example 15

In the preparation of N-cyclohexyl phenylacetamidine hydrochloride 6.8 g. of finely-powdered anhydrous aluminium chloride are added gradually to a mixture of 9.9 g. of cyclohexylamine, 11.7 g. of benzylcyanide and 50 cc. of benzene contained in a vessel fitted with a reflux condenser. After the addition the mixture is boiled under reflux for 2 hours and is then allowed to cool. To the cooled product 50 cc. of water are added and the mixture is distilled until all the benzene is removed. The residue from this distillation is cooled and N-cyclohexyl phenylacetamidine hydrochloride which separates is purified by recrystallisation from water.

Example 16

In the preparation of N-cyclohexylanisamidine hydrochloride 7.0 g. of finely-powdered anhydrous aluminium chloride are added to a mixture of 7.65 g. of anisonitrile and 6.0 g. of cyclohexylamine. The mixture, which becomes heated by the exothermic reaction to a temperature of about 240° C. is then cooled and crystallised from water. There is thus obtained N-cyclohexylanisamidine hydrochloride in the form of crystals having a melting point of 275-276° C. with decomposition. (Found: N, 10.2; $C_{14}H_{21}ON_2Cl$ requires N, 10.4%.)

Example 17

In the preparation of p-methylsulphonyl-N:N-diethylbenzamidine picrate a mixture of 9.0 g. of p-methylsulphonyl benzonitrile, 7.3 g. of diethylamine and 7.0 g. of powdered anhydrous aluminium chloride is heated at a temperature of 100° C. during 90 minutes. After cooling, the product is extracted with hot water and filtered. The filtrate is cooled, made strongly alkaline by addition of sodium hydroxide solution and extracted with chloroform. The chloroform solution is distilled in order to remove chloroform and the residue is mixed with a warm alcoholic solution of picric acid. p-Methylsulphonyl-N:N-diethylbenzamidine picrate which separates on cooling is purified by recrystallisation from methyl alcohol whereby it is obtained in the form of crystals having a melting point of 184.5° C. (Found: N, 14.7; $C_{18}H_{21}O_9N_5S$ requires N, 14.5%.)

Example 18

In the preparation of N:N-pentamethylenebenzamidine a mixture of 10.3 g. of benzonitrile and 8.5 g. of piperidine is cooled in ice-water while 13.4 g. of finely-powdered anhydrous aluminium chloride are added during 20 minutes. The mixture, which becomes heated during the addition of aluminium chloride, is then further heated on the steam bath for 1.5 hours. After cooling, the product is mixed with 20 cc. of water and 20 g. of ice and the mixture is extracted with chloroform. The separated aqueous layer is made alkaline to Titan yellow by addition of 5 N sodium hydroxide solution and the alkaline mixture is extracted with chloroform. This extraction is repeated several times and then the chloroform extracts of the alkaline solution are combined dried over anhydrous potassium carbonate and distilled in order to remove chloroform. The residue from this distillation is submitted to fractional distillation in vacuo. N:N-pentamethylenebenzamidine distils at a temperature of 98° C. under a pressure of 0.4 mm. of mercury and is collected as a colourless oil. (Found: N, 14.9; $C_{12}H_{16}N_2$ requires N, 14.9%.)

*Example 19*

In the preparation of p-methylsulphonyl-N:N-pentamethylenebenzamidine, a mixture of 9.0 g. of p-methylsulphonylbenzonitrile, 8.5 g. of piperidine and 7.0 g. of powdered anhydrous aluminium chloride is heated at a temperature of 100° C. during 90 minutes. After cooling, the product is extracted with hot water and filtered. The filtrate is cooled, made strongly alkaline by addition of sodium hydroxide solution and extracted with chloroform. The chloroform solution is distilled in order to remove chloroform and the residue is crystallised from acetone whereby p-methylsulphonyl-N:N-pentamethylenebenzamidine is obtained in the form of crystals having a melting point of 97° C. (Found: N, 10.4; $C_{13}H_{19}O_2N_2S$ requires N, 10.5%.)

*Example 20*

In the preparation of N-benzylbenzamidine hydrochloride 13.3 g. of finely-powdered anhydrous aluminium chloride are added during 30 minutes, with stirring, to a mixture of 10.3 g. of benzonitrile and 10.7 g. of benzylamine. During the addition the mixture becomes heated to a temperature of about 120° C. After the addition, the mixture is heated at a temperature of 180° C. for 20 minutes with occasional stirring and is then allowed to cool. The product is dissolved in 200 cc. of hot water and the hot solution is filtered. The filtrate is cooled, 5 N sodium hydroxide solution is added until the mixture is alkaline to Titan yellow and the mixture is extracted with chloroform. The chloroform extraction is repeated several times and then the combined extracts are distilled in order to remove the chloroform. The residue from this distillation is suspended in 20 cc. of water and 5 N hydrochloric acid is added until the mixture is neutral to bromo-thymol blue. The neutral solution is warmed, stirred with a little charcoal and filtered and the filtrate is cooled in ice. N-benzylbenzamidine hydrochloride which separates on cooling is filtered off and recrystallized from absolute alcohol whereby it is obtained in the form of crystals having a melting point of 229–230° C.

*Example 21*

In the preparation of N-benzylanisamidine hydrochloride 13.4 g. of finely-powdered anhydrous aluminium chloride are added to a mixture of 13.3 g. of anisonitrile and 11.0 g. of benzylamine. The mixture, which becomes heated by the exothermic reaction to a temperature of about 200° C. is then cooled and crystallised from water. There is thus obtained N-benzylanisamidine hydrochloride in the form of crystals having a melting point of 225° C. (Found: N, 10.1%; $C_{15}H_{17}ON_2Cl$ requires N, 10.1%.)

*Example 22*

In the preparation of N-phenylacetamidine picrate a mixture of 4.1 g. of acetonitrile and 18.6 g. of aniline is stirred in a vessel fitted with a reflux condenser while 13.4 g. of finely-powdered anhydrous aluminium chloride are added gradually so that the temperature of the mixture, which rises during the addition, does not exceed 100° C. After the addition the mixture is heated with stirring so that the temperature remains at about 100° C. for 15 minutes. The hot mixture is then poured on to 60 g. of ice and the mixture is warmed until a clear solution is obtained. The solution is stirred with charcoal and filtered and the filtrate is mixed with 40 cc. of 10 N sodium hydroxide solution. The alkaline mixture is extracted three times with 100 cc. portions of chloroform and the chloroform extracts are combined and distilled in order to remove chloroform. The residue from this distillation is heated under a pressure of 4 mm. of mercury so that material boiling below 60° C. at this pressure is removed. The residue from this reduced-pressure distillation is dissolved in 15 cc. of methyl alcohol, water is added until a turbidity is produced and the mixture is cooled in ice. A little N:N'-diphenylacetamidine formed as by-product during the reaction separates in the form of crystals. The cooled mixture is filtered and the filtrate is made acid to brilliant yellow by adding alcoholic picric acid solution. N-phenylacetamidine picrate, which is precipitated, is filtered off and purified by crystallisation from methyl alcohol whereby it is obtained in the form of crystals having a melting point of 194–195° C.

*Example 23*

In the preparation of N-phenylbenzamidine a mixture of 4.7 g. of aniline, 5.2 g. of benzonitrile and 6.8 g. of finely-powdered anhydrous zinc chloride is heated at a temperature of 110° C. during 30 minutes and is then quickly heated to a temperature of 210° C. at which temperature the mixture becomes liquid, and immediately cooled. The product is triturated with a hot mixture of 10 cc. of water and 5 cc. of 5 N hydrochloric acid and the solution is poured with stirring into a mixture of 20 cc. of 10 N sodium hydroxide solution and 20 g. of ice. The material which is precipitated is filtered off, washed with water and extracted with hot alcohol. The alcohol extract is concentrated and cooled whereupon N-phenylbenzamidine separates in the form of crystals having a melting point at 116° C.

*Example 24*

In the preparation of N-(o-nitrophenyl)benzamidine picrate a mixture of 10.3 g. of benzonitrile and 13.8 g. of o-nitraniline is heated at a temperatrue of about 50° C. until a homogeneous solution is obtained and to this 13.4 g. of finely-powdered anhydrous aluminium chloride are added. The mixture is heated with stirring at a temperature of 140° C. for 20 minutes and is then cooled and triturated with 80 cc. of water. The mixture is filtered, the filtrate is washed with ether and then mixed with 35 cc. of 10 N sodium hydroxide solution. The alkaline mixture is extracted several times with chloroform and the combined chloroform extracts are distilled in order to remove chloroform. The residue from this distillation is suspended in 20 cc. of water and 5 N hydrochloric acid is added until the solution is neutral to Congo red. The mixture is stirred with charcoal and filtered and the filtrate is mixed with excess sodium picrate solution. N-(o-nitrophenyl)benzamidine picrate which is thereby precipitated is filtered off and purified by crystallisation from aqueous cellosolve whereby it is obtained in the form of crystals having a melting point of 208–209° C. (Found: N, 17.9; $C_{19}H_{14}O_9N_6$ requires N, 17.9%.)

Example 25

In the preparation of N-phenyl-2:4-dichlorobenzamidine hydrochloride a mixture of 8.6 g. of 2:4-dichlorobenzonitrile and 4.7 g. of aniline is warmed to a temperature of about 50° C. until a homogeneous solution is formed and to this 6.7 g. of finely-powdered anhydrous aluminium chloride are added during 10 minutes. During the addition the temperature of the mixture rises to about 130° C. When all the aluminium chloride has been added the mixture is heated so that it is maintained at a temperature of 140° C. for an hour. After cooling, the product is dissolved in 150 cc. of warm water; the solution is cooled, filtered and shaken with chloroform. The separated aqueous solution is mixed with 40 cc. of 10 N sodium hydroxide solution and the mixture is extracted several times with chloroform. The chloroform extracts of the alkaline solution are combined and distilled in order to remove chloroform. The residue from this distillation is suspended in 20 cc. of water and 5 N hydrochloric acid is added until the solution is neutral to Congo red. The mixture is warmed, stirred with a little charcoal and filtered and the filtrate is cooled in ice. N-phenyl-2:4-dichlorobenzamidine hydrochloride separates in the form of crystals having a melting point of 147–149° C. after drying at 110° C.

Example 26

In the preparation of N-methyl-N-phenylbenzamidine 6.7 g. of powdered anhydrous aluminium chloride are added to a mixture of 5.15 g. of benzonitrile and 5.35 g. of methylaniline. The mixture, which becomes heated owing to an exothermic reaction, is maintained at a temperature of 160° C. for 20 minutes and is then cooled. The product is worked up as described in Example 28 and, by crystallisation from light petroleum, N-methyl-N-phenylbenzamidine is obtained in the form of crystals having a melting point of 85.5° C.

Example 27

In the preparation of N:N-diphenylpicolinamidine a mixture of 5.2 g. of α-cyanopyridine and 8.5 g. of diphenylamine is warmed until a homogeneous solution is obtained and to this 6.7 g. of finely-powdered anhydrous aluminium chloride are added in two portions with stirring. The mixture, which becomes heated during the addition to a temperature of about 85° C. is then heated at a temperature of 140° C. for 30 minutes. After cooling, the product is triturated with 50 cc. of water and the mixture is filtered. The filtrate is shaken with 30 cc. of ether and the separated aqueous layer is mixed with 30 cc. of 10 N sodium hydroxide solution. The alkaline mixture is extracted with 100 cc. of chloroform, the aqueous layer is separated and the extraction is repeated five times. The chloroform extracts are combined, washed with 5 cc. of water and distilled in order to remove chloroform. The residue from this distillation is purified by several recrystallisations from petroleum ether whereby N:N-diphenylpicolinamidine is obtained in the form of crystals having a melting point of 129–130° C. (Found: N, 15.2; $C_{18}H_{15}N_3$ requires N, 15.4%.)

Example 28

In the preparation of p-methylsulphonyl-N-α-pyridylbenzamidine a mixture of 9.05 g. of p-methylsulphonylbenzonitrile, 4.7 g. of α-aminopyridine and 4.5 g. of powdered anhydrous aluminium chloride is heated at a temperature of 180° C. for 20 minutes. The product is cooled, extracted with hot water and filtered and the aqueous solution is cooled, made strongly alkaline by addition of sodium hydroxide solution and extracted with chloroform. The chloroform extract is separated, distilled in order to remove chloroform and the residue is crystallised from methyl alcohol whereby p-methylsulphonyl-N-α-pyridylbenzamidine is obtained in the form of crystals having a melting point of 170.5° C.

Example 29

In the preparation of N-α-pyridylbenzamidine 6.7 g. of finely-powderered anhydrous aluminium chloride are added to a mixture of 5.15 g. of benzonitrile and 4.7 g. of α-aminopyridine and the mixture is heated at a temperature of 200° C. for 15 minutes. After cooling, the product is worked up as described in Example 28. By crystallisation of the crude amidine from petroleum ether N-α-pyridylbenzamidine is obtained in the form of crystals having a melting point of 99–99.5° C. (Found: N, 21.3; $C_{12}H_{11}N_3$ requires N, 21.2%.)

Example 30

In the preparation of α:γ-bis(p-N-phenylamidino) phenoxypropane benzenesulphonate a mixture of 5.6 g. of pp'-dicyanodiphenoxypropane and 3.7 g. of aniline is heated to a temperature of 140° C. and 2.67 g. of finely-powdered anhydrous aluminium chloride is added during 10 minutes with stirring. After the addition, the mixture is maintained at temperature of 140° C. for 20 minutes and is then allowed to cool. The product is warmed with 20 cc. of water, 100 cc. of hot alcohol are added and the solution is poured with stirring into 40 cc. of 10 N sodium hydroxide solution cooled in ice-water. The precipitated material is filtered off, washed with water and suspended in a mixture of 105 cc. of alcohol and 45 cc. of water and concentrated hydrochloric acid is added to the suspension until a solution neutral to Congo red is obtained. The solution is heated, stirred with a little decolouring charcoal and filtered and the warm filtrate is added to a mixture of 10 cc. of 10 N sodium hydroxide solution and 40 g. of ice. The precipitated material is filtered off, washed with water and suspended in water and to the suspension benzenesulphonic acid is added until a solution acid to Congo red is obtained. The mixture is heated to dissolve solid material, the hot solution is stirred with a little decolourising charcoal and filtered. On cooling the filtrate α:γ-bis(p-N-phenylamidino) phenoxypropane benzenesulphonate separates and is purified by recrystallisation from water whereby it is obtained in the form of crystals having a melting point of 219–220° C. (Found, N, 7.3; $C_{41}H_{40}N_4O_8S_2$ requires N, 7.2%.)

We claim:
1. In a process for the manufacture of compounds containing amidine groups by reacting a nitrile of the general formula R.CN, where R is a member of the group consisting of alkyl, aryl, and aralkyl radicals and heterocyclic radicals in which the hetero atoms are nitrogen atoms and the unsatisfied valency bond is on a carbon atom, with a compound selected from the group consisting of urea, ammonia, and mono-functional primary and secondary amines of the aliphatic, araliphatic, and aromatic series and of the heterocyclic series in which the hetero atoms are nitrogen atoms, the step which consists in promoting the reaction by the use of a substance selected from the group consisting of aluminum chloride, zinc chloride, ferric chloride, and stannic chloride.

2. In a process for the manufacture of compounds containing amidine groups by reacting a nitrile of the general formula R.CN, where R is a member of the group consisting of alkyl, aryl, and aralkyl radicals and heterocyclic radicals in which the hetero atoms are nitrogen atoms and the unsatisfied valency bond is on a carbon atom, with urea, the step which consists in promoting the reaction by the use of a substance selected from the group consisting of aluminum chloride, zinc chloride, ferric chloride, and stannic chloride.

3. In a process for the manufacture of compounds containing amidine groups by reacting a nitrile of the general formula R.CN, where R is a member of the group consisting of alkyl, aryl, and aralkyl radicals and heterocyclic radicals in which the hetero atoms are nitrogen atoms and the unsatisfied valency bond is on a carbon atom, with a compound selected from the group consisting of mono-functional primary and secondary amines of the aliphatic, araliphatic, and aromatic series and of the heterocyclic series in which the hetero atoms are nitrogen atoms, the step which consists in promoting the reaction by the use of a substance selected from the group consisting of aluminum chloride, zinc chloride, ferric chloride, and stannic chloride.

4. In a process for the manufacture of compounds containing amidine groups by reacting a nitrile of the general formula R.CN, where R is a member of the group consisting of alkyl, aryl, and aralkyl radicals and heterocyclic radicals in which the hetero atoms are nitrogen atoms and the unsatisfied valency bond is on a carbon atom, with ammonia, the step which consists in promoting the reaction by the use of a substance selected from the group consisting of aluminum chloride, zinc chloride, ferric chloride, and stannic chloride.

WALLACE FRANK SHORT.
MAURICE WILLIAM PARTRIDGE.

REFERENCES CITED

The following references are of record in the file of this patent:

UNITED STATES PATENTS

| Number | Name | Date |
|---|---|---|
| 2,049,582 | Ziegler | Aug. 4, 1936 |
| 2,375,611 | Barber et al. | May 8, 1945 |
| 2,425,223 | Barber | Aug. 5, 1947 |

FOREIGN PATENTS

| Number | Country | Date |
|---|---|---|
| 507,565 | Great Britain | Nov. 25, 1938 |
| 635,494 | Germany | Sept. 18, 1936 |
| 671,785 | Germany | Feb. 14, 1939 |

OTHER REFERENCES

Shriner et al., "Chemical Reviews," December 1944, pages 360 and 363.